United States Patent
Hoffmann et al.

[11] Patent Number: 5,404,744
[45] Date of Patent: Apr. 11, 1995

[54] POSITION CONTROLLER

[75] Inventors: Heinfried Hoffmann, Frankfurt; Lothar Kemmler, Mörfelden-Walldorf; Bernd Mann, Wiesbaden, all of Germany

[73] Assignee: Samson Aktiengesellschaft, Frankfurt, Germany

[21] Appl. No.: 131,134

[22] Filed: Oct. 4, 1993

[30] Foreign Application Priority Data

Oct. 3, 1992 [DE] Germany ............... 42 33 300.8

[51] Int. Cl.⁶ ................ G01C 25/00; G05G 23/00
[52] U.S. Cl. ......................... 73/1 D; 74/105; 74/522; 91/387
[58] Field of Search ............... 91/387; 74/105, 522; 73/1 R, 1 D

[56] References Cited

U.S. PATENT DOCUMENTS

| | | | |
|---|---|---|---|
| 3,377,600 | 4/1968 | Nolte | 74/522 X |
| 4,922,952 | 5/1990 | Kemmler | 91/387 X |
| 4,925,498 | 5/1990 | Kemmler | 91/387 |
| 5,218,994 | 6/1993 | Jeschke | 137/554 |

*Primary Examiner*—Allan D. Herrmann
*Attorney, Agent, or Firm*—Hill, Steadman & Simpson

[57] ABSTRACT

Position control for pneumatic positioning devices and the like, comprising a sensing lever linked to the drive rod of the positioning device and comprising a measuring lever acting on a measuring system, whereby the one lever is seated on a position control axle with positive lock or form-fit and the other lever is seated on said position control axle with non-positive lock, and comprising at least one detent acting on the measuring lever with which the sensing lever and the measuring lever are brought into an angle relative to one another that corresponds to a zero setting.

10 Claims, 2 Drawing Sheets

POSITION CONTROLLER

BACKGROUND OF THE INVENTION

The invention is directed to a position controller for pneumatic positioning devices and the like. Such positioning devices are disclosed, for example, in U.S. Pat. Nos. 4,922,952 and 4,925,498.

Position controllers for pneumatic positioning devices must be set with respect to their zero point after assembly. Usually, a zero point screw is turned until the drive rod of the positioning device just moves.

The allocation of the closed position of the positioning device to the zero position of the position control measuring system is not always the same due to dimensional deviations and variable allocation between drive rod and cone. The full range of the measuring system can therefore not always be used without readjustment of the zero point.

SUMMARY OF THE INVENTION

The object of the invention is to create a position control for pneumatic positioning devices and the like wherein a zero setting ensues in a simple way.

This object is inventively achieved by a sensing lever hinged to the drive rod of the positioning device and by a measuring lever acting on the measuring system, whereby the one lever is seated on a position control axis with positive lock or with a material fit and the other lever is seated on a position control axis with non-positive lock and by at least one detent acting on the measuring lever with which the sensing lever and the measuring lever are brought into an angle relative to one another that corresponds to a zero setting.

A preferred embodiment is characterized in that the detent is fashioned as a manually actuatable adjusting lever. The adjusting lever is thereby preferably linked at one side and is provided with a restoring spring. The adjusting lever can thereby comprise at least one detent surface acting on the measuring lever. A preferred embodiment is characterized in that the lever seated on the position control axis with non-positive lock is slotted at its one end and in that a spring is provided that presses the slotted end section of the lever against the position control axis with a defined force.

In another exemplary embodiment, the detent is arranged lying opposite the position control axis. Two detents can thereby also be provided.

The invention shall be set forth below with reference to the drawings.

DETAILED DESCRIPTION OF THE PREFERRED EMBODIMENTS

Figure 1:
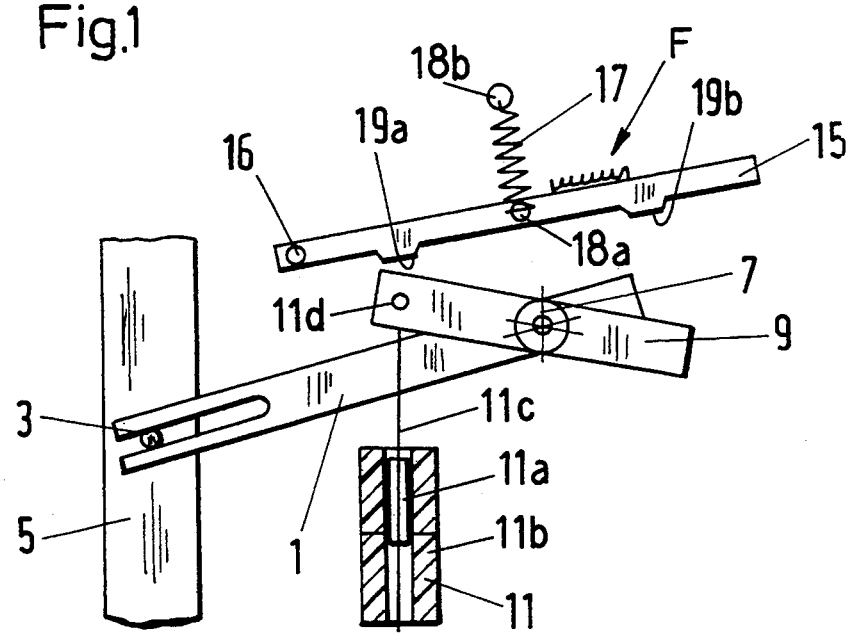
FIG. 1 is an elevational schematic illustration of a position control of a first exemplary embodiment in the working position.
Figure 3:
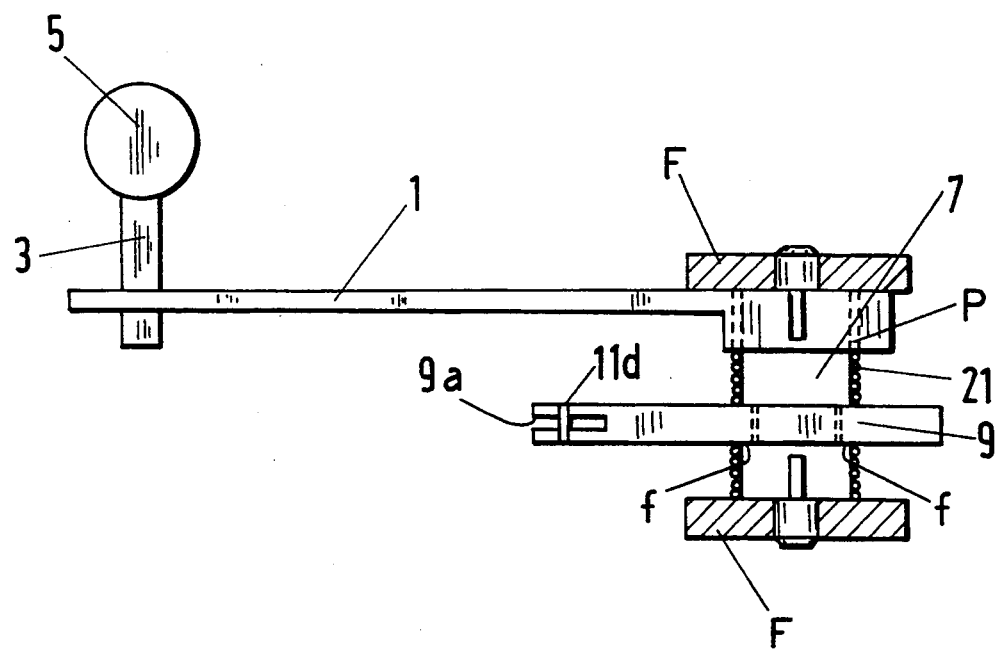
FIG. 3 is a plan schematic view of the position control without the adjustment lever being shown.

The position control of the present invention is applicable, for example, to control devices such as disclosed in U.S. Pat. Nos. 4,922,952 and 4,925,498, incorporated herein by reference. As illustrated in FIG. 1, the control is composed of a sensing lever 1 that is linked to the drive rod 5 of a positioning device via a tracing pin 3 and is further composed of a measuring lever 9 acting on a position indicator or measuring system 11 such as a differential transformer having a magnetic element 11a and a coil 11b. The element 11a is connected via a wire 11c to a pin 11d journaled across a slot 9a through the lever 9 as shown in FIG. 3. The other end of the sensing lever 1 is seated on a position control axle 7 with positive lock, such as a keyed arrangement or a form-fit (press fit) p, this position control axle 7 accepting the measuring lever 9 with a non-positive lock. The measuring lever 9 thus acts as an element of a friction clutch for the position control axle 7; the angle between the sensing lever 1 and the measuring lever 9 is variable but remains constant without external influence.

Figure 2:
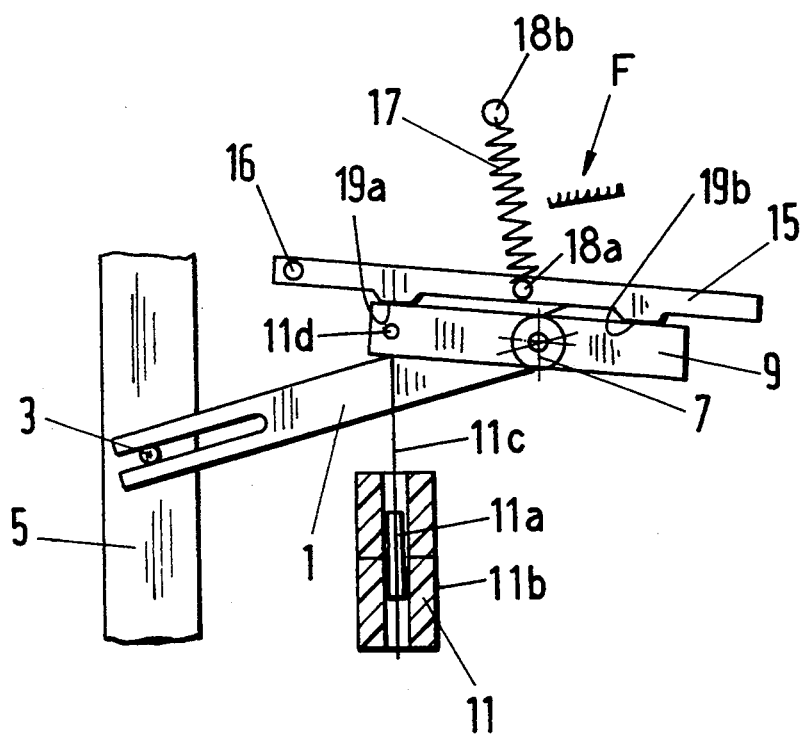
FIG. 2 is an elevational schematic illusion of the position control shown in FIG. 1 given actuation of the adjusting lever.

Given the exemplary embodiment shown in FIGS. 1 and 2, this adjustment ensues via an adjusting lever 15 that is pivotally connected at a pin 16 to a stationary part or framework F of the device at one side and is provided with a restoring spring 17 connected at a point 18a to the lever 15 and also connected to the stationary framework F of the device at point 18b.

For adjustment, the positioning device is brought into its zero position as shown in FIG. 2. The position of the sensing lever 1 and the position of the position control axle are thus defined. The measuring lever 9 that acts on the measuring system 11, which is shown here as a differential transformer, is in an arbitrary, undefined position. Given an actuation of the zero adjusting lever 15 opposite the force of the spring 17, this places detent surfaces 19a, b against the measuring lever 9. A rotation of the measuring lever seated with non-positive lock on the position control axle 7 thereby ensues relative to the latter into a defined position. The angle thereby assumed between the measuring lever 9 and the sensing lever 1 is the zero position of the position control (see FIG. 2).

As illustrated in FIG. 3, the measuring lever 9 seated on the positioning axle 7 with non-positive lock has its one end slotted. A spring 21 is provided which presses the measuring lever 9 against the position control axle 7 with a defined force, as a result whereof a defined fictional force is established in a region f between the measuring lever 9 and the position control axle 7. The slot 9a of the measuring lever 9 allows the wire 11c to maintain a vertical orientation notwithstanding the angle of the measuring lever 9.

It is self-evident that—differing from the illustrated exemplary embodiment—the sensing lever can also be seated on the position control axle with non-positive lock and the measuring lever can be seated on the position control axle with positive lock or form-fit.

Figure 4:
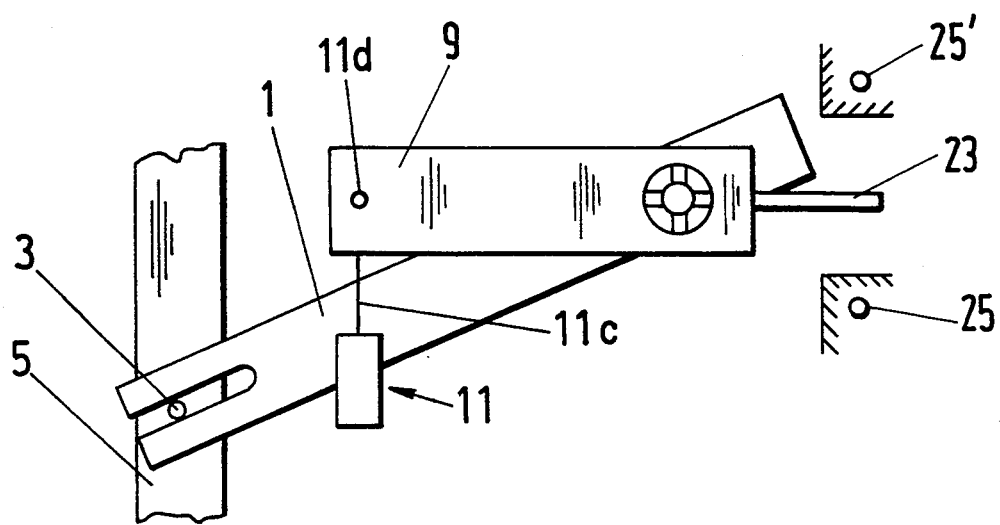
FIG. 4 is an elevational schematic illustration of the measuring lever in another exemplary embodiment.

A separate adjusting lever 15 is not provided in the exemplary embodiment shown in FIG. 4. On the contrary, the zero adjustment ensues on the basis of at least one pin or detent 25 (two are shown in FIG. 4). The zero position of the measuring system is reached when the pin 23, which is an extension of the measuring lever 9, strikes against a first pin 25. At the approach, the positioning device can be in an undefined position, but such that the pin 23 presses against the first detent 25 before the zero position of the positioning device is reached (factory setting). When the positioning device is then moved into the zero position, the sensing lever 1 entrains the measuring lever 9 via the position control axle 7 and the friction clutch until the pin 23 presses against the first detent 25. This position of the measuring lever corresponds to the zero position of the measuring system. An unambiguous allocation between the zero point of the positioning device and the zero position of the measuring system is thus established. Potential variations of the positioning device due to wear or due to the placement of soft packings are thus automatically compensated. The detents, however, can also be removed from the working region after the zero setting either manually or, on the other hand, via appropriate magnets.

Both individually as well as in arbitrary combinations, the features of the invention disclosed in the above specification, in the drawing as well as in the claims can be applied to the various embodiments of the invention.

Although the present invention has been described with reference to a specific embodiment, those of skill in the art will recognize that changes may be made thereto without departing from the scope and spirit of the invention as set forth in the appended claims.

We claim as our invention:

1. A position control for pneumatic positioning devices comprising:
    a sensing lever linked to the drive rod of the positioning device; and
    a measuring lever acting on a measuring system;
    one of said levers is seated on a position control axle positively locked thereto and the respective other lever is seated on said position control axle with non-positive lock; and
    at least one detent means for acting on the measuring lever to bring the measuring lever into an angle relative to a zero setting for the sensing lever.

2. A position control according to claim 1, wherein the detent means comprises an adjusting lever to be manually actuated.

3. A position control according to claim 2, wherein the adjusting lever is linked at one side and is provided with a restoring spring.

4. A position control according to claim 2, wherein the adjusting lever comprises at least one detent surface acting on the measuring lever.

5. A position control according to claim 1, wherein a spring is provided that presses one end section of the respective other lever against the position control axle with a defined force.

6. A position control according to claim 1, wherein the detent means is stationarily arranged relative to the position control axle.

7. A position indicator assembly for measuring the movement of a rod, comprising:
    a stationary framework;
    a sensing lever linked to the rod and mounted for pivoting with respect to said framework;
    a measuring lever mounted for pivoting with respect to said framework and having a moving indicating element thereof;
    a means for indicating the position of said moving indicating element;
    a friction clutch means arranged between said sensing lever and said measuring lever for causing mutual pivotal movement of said sensing lever and said measuring lever during movement of said rod, and disparate movement upon application of differential force on the sensing lever and measuring lever respectively; and
    a setting means for applying a force on said measuring lever to hold said measuring lever to a preselected datum position.

8. The position indicator according to claim 7, wherein said sensing lever and said measuring lever are mounted for pivoting about a single axis.

9. The position indicator according to claim 7, wherein said setting means comprises an adjusting lever mounted pivotally to said framework and abuttable to a side of said measuring lever to hold said measuring lever.

10. The position indicator according to claim 7, wherein said setting means comprises a pin mounted to said framework at a position to interfere with said measuring lever at said preselected datum position.

* * * * *